United States Patent Office 3,783,144
Patented Jan. 1, 1974

3,783,144
PROCESS FOR PRODUCING FLUORONITRO ALCOHOL COMPOUNDS
Marion E. Hill, Palo Alto, and Leonard O. Ross, Sunnyvale, Calif., assignors to the United States of America as represented by the United States Atomic Energy Commission
No Drawing. Original application Aug. 13, 1968, Ser. No. 752,181. Divided and this application Oct. 16, 1970, Ser. No. 81,613
Int. Cl. C07c 31/34
U.S. Cl. 260—633                         1 Claim

ABSTRACT OF THE DISCLOSURE

Process wherein a selected α-fluoronitrocarboxylic acid ester is reduced by reaction with sodium borohydride in a selected solvent system containing from about 25 to about 75% by volume of water to preferentially yield α-fluoronitro-alcohol compound.

---

The present application is a division of application S.N. 752,181, filed Aug. 13, 1968, and now abandoned.

BACKGROUND OF THE INVENTION

This invention was made in the course of, or under, Contract No. AT(04-3)-115, Project Agreement No. 38, with the United States Atomic Energy Commission.

FIELD OF THE INVENTION

This invention relates to a process for producing fluoronitro-alcohol, aldehyde and hemiacetal compounds, and, more particularly, to a process for producing such compounds by reducing α-fluoronitrocarboxylic acid esters with sodium borohydride in a selected solvent system, as well as to derivatives of said compounds.

Compounds containing significant proportions of nitro and fluoro substituent groups have particular utility as plasticizers or as energetic components for formulating or as intermediates for synthesizing explosive and high impulse propellant compositions. Compounds containing nitrodifluoromethyl groups are especially desirable. Compounds of this type, viz, aliphatic glycol esters of difluoronitroacetic acid, as used in formulating explosive compositions, have been described in U.S. Pat. No. 3,267,134, issued Aug. 16, 1966 to Eugene R. Bissell. 2,2-difluoro-2-nitroethanol is disclosed to be an excellent monopropellant in U.S. Pat. No. 3,203,999, issued Aug. 31, 1965 to Gardner et al., wherein methods for producing the compound by the addition of dinitrogen tetroxide to 1,1-difluoroethylene or by the reduction of difluoronitroacetic acid with diborane formed, in situ, by the reaction of boron trifluoride etherate with sodium borohydride. These prior art methods are expensive, difficult to operate, and the yields are low. There accordingly exists a need for a facile procedure for producing α-fluoronitro-alcohols and related compounds.

SUMMARY OF THE INVENTION

A process has now been discovered wherein sodium borohydride can be especially effectively utilized for reducing certain esters of α-fluoronitrocarboxylic acids in an especially selected solvent system to produce fluoronitro-alcohol, fluoronitro-aldehyde and novel fluoronitro-hemiacetal compounds. The nature of the products is primarily influenced by the composition, i.e., structure of the precursor compound and by the components and proportions of the solvent system. These factors are more directive in determining which compounds are produced than are conditions of temperature, stoichiometry and reaction period.

Illustrative of the foregoing generalization, methyl difluoronitroacetate in aqueous dimethoxyethane (DME) reduces primarily to methyl difluoronitroacetaldehyde hemiacetal, Compound A, plus small amounts of difluoronitroacetaldheyde, Compound B, and 2,2,2-difluoronitroethanol, Compound C, shown below:

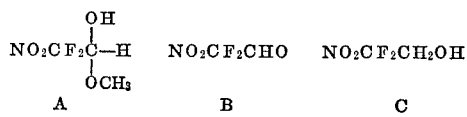

A          B          C

In the same solvent mixture, ethyl and benzyl, difluoronitroacetates reduce in good yield only to the alcohol, C. α-fluoronitro-alcohols of the type including C are quite expensive and difficult to obtain by other methods.

With but few exceptions, hemiacetals as a class do not exist as stable compounds, although they are produced in small amounts as unstable transitory intermediates, for example, in the addition reaction between alcohols and aldehydes wherein they exist in very small amounts in equilibrium with the product acetals and starting materials, e.g., in the presence of hydrogen chloride. The facile production of stable hemiacetals of novel composition under selected conditions as provided herein is, accordingly, a surprising and most beneficial development, as is the facile production of the fluoronitro-alcohols and fluoronitro-aldehydes.

Accordingly, it is a general object of the invention to provide a process for economically and easily producing hemiacetal, aldehyde and alcohol compounds by the reduction of α-difluoronitrocarboxylic acid esters.

A further object of the invention is to provide a process in which a selected difluoronitroacetate ester or a selected bisdifluoronitroacetates ester dissolved in a selected solvent system is reacted with sodium borohydride to produce at least one product in the nature of an α-difluoronitro-alcohol, an α-difluoronitro-hemiacetal, or an α-difluoronitro-aldehyde compound.

Other objects and advantages of the invention will become apparent by consideration of the following description of the invention.

DESCRIPTION OF THE INVENTION

In brief, in preparing the process of the invention, a selected α-fluoronitrocarboxylic acid ester and sodium borohydride are intermixed with vigorous agitation at a controlled rate in the presence of an especially selected solvent system, whereupon an exothermic reducing reaction occurs. Usually one of the reagents, dissolved or thoroughly dispersed in a selected medium, is added progressively to a solution or intimate dispersion of the other reagent in a similar selected medium. The reaction is generally completed shortly after all of the reagents are intermixed.

A reaction product mixture is obtained containing enhanced proportions of an α-fluoronitro-hemiacetal or an α-fluoronitro-alcohol, together with minor-to-significant amounts of an α-fluoronitroaldehyde dependent upon certain conditions set forth hereinafter. The over-all type reactions which occur are illustrated in the following equations:

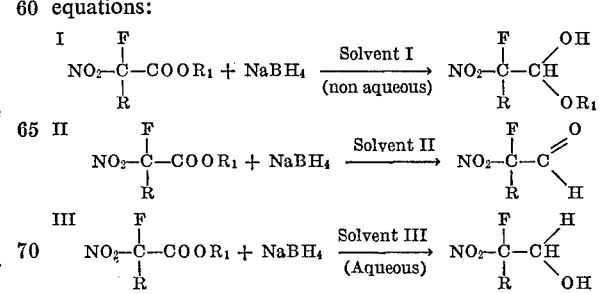

Compounds amenable to treatment in the processes of the invention can be generally considered to be α-fluoronitrocarboxylic acid esters corresponding to those indicated in the foregoing formulas in which the R group can be F, Cl, $NO_2$, H or alkyl chains of short length, i.e., from 1 to about 5 carbon atoms in normal and branched chains, and including fluorinated, chlorinated and nitrated alkyl chains. In particular, in the case of the hemiacetal compounds, it is considered that at least one nitro and one fluoro group must be provided at said α-position in order that the product hemiacetal be stable. The high electronegativity of the two groups, F and $NO_2$, especially when an additional electronegative group, e.g., when R of the above Formula I is F, $NO_2$, or Cl, etc., is in the α-position, is believed to provide the unexpected stability of the novel hemiacetals of the invention.

The $R_1$ alcohol substituents can generally be lower molecular weight aryl and alkyl-aryl radicals, e.g., benzyl, radicals or lower normal alkyl groups of 1 to 6 carbon units, as well as corresponding branched chain alkyl groups and cycloalkyl groups. Moreover, the alcohol esterification substituent can be a glycol of 2 to at least 15 carbon units in either a normal or branched chain configuration, in which case the starting ester would be of the configuration:

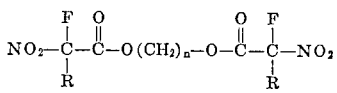

Where $n$ is from 2 to 15 carbon atoms and of either normal or branched chain configuration, one specific compound that is easily reduced in this fashion is BEAF, the ethylene glycol diester of difluoronitroacetic acid, i.e., $n=2$. Other specific diester compounds which can also be used are the difluoronitroacetates of 1,2-ethandiol, 1,2-propandiol, 1,3-propandiol, 1,3-butandiol, 1,4-butandiol, diethylene glycol and nitro- and fluoro-substituted diesters of the type described in the aforesaid patent of Eugene R. Bissell. Materials of the foregoing types react with particularly advantageous facility. Moreover, particular alcohol substituents exert a considerable influence, particularly with the cooperative influence of especially selected solvent systems, described below, in determining which of the foregoing reactions predominate and therefore which product is selectively produced.

Generally speaking, the preferred solvent phase in each of the foregoing reactions comprises a stable nonhydroxylic, noncarbonylic, fluid-oxygenated hydrocarbon in which the reactants must be soluble to a substantially complete degree to give homogenous reaction mixtures, and which is essentially inert. With nonhomogenous reaction mixtures, incomplete reduction occurs, possibly due to precipitation of intermediate borate salts. Optimum yields have been obtained with dimethoxyethane (DME) and tetrahydrofuran (THF), with lesser yields from diglyme, i.e., diethyleneglycol-dimethylether. Lower molecular weight alkyl-glycol diethers and internal or cyclic ethers are accordingly preferred solvents for conducting the present syntheses.

For producing predominantly hemiacetals in accord with Equation I, solvent phase I must be a dry solvent or reaction medium of the character described, i.e., the water content is maintained at a low level approaching, but not necessarily being anhydrous, thereby avoiding or minimizing production of aldehyde and/or alcohol products.

For producing predominantly alcohols in accord with Equation III, solvent III is, what is termed herein, an aqueous solvent or reaction medium, i.e., a mixture of water and one of said organic solvents. Mixtures of water and solvent containing from about 25 to 75% by volume of water may be used, provided that the reactants are soluble therein as noted below. The lower limit of water content will be defined at a level at which reaction I begins to assume excessive proportions, and where alcohol production is unduly diminished. Approximately equal part mixtures of water and said solvent (DME, THF, etc.) have proven effective for obtaining optimum yields in most instances, and are especially preferred.

The reaction of Equation II proceeds with various proportions of water in the solvents, generally producing aldehyde as a coproduct, ranging from a minor to a major proportion, which coproduct can be treated and recovered as noted hereinafter.

FLUORONITRO-HEMIACETAL COMPOUNDS AND DERIVATIVES THEREOF

More specifically, for producing fluoronitro-hemiacetal compounds of the invention, a suitable α-fluoronitro-carboxylic acid ester, such as nitrodifluoroacetate ester of lower molecular weight alkanols, including methyl, ethyl, isopropyl, benzyl alcohol or glycol ester of the character described above, is first prepared. A solution of said ester dissolved preferably in a dry, i.e., nonaqueous solvent such as dimethoxyethane (DME) or tetrahydrofuran (THF) is then intermixed with a dispersion, preferably with about an equimolar amount of $NaBH_4$ in a portion of a similar nonaqueous solvent, whereupon an exothermic reaction, as shown in Equation I above, ensues which is usually complete in less than one hour. Hemiacetals are produced when methanol is used with the methyl ester of difluoronitroacetate as a solvent, but in much lower yields since the common methyl group does not interfere to completely block the reduction. In general, prompt workup of the product is undertaken to avoid degradation.

The reaction mixture is then added to cold or ice water to complete the reaction, and the product is extracted with a low-boiling solvent such as ether (dimethyl or diethyl) or methylene chloride. The ether solution may be dried, e.g., with $MgSO_4$, filtered, and the solvent evaporated to leave a crude product. Provided that the product is thermally stable which is the case with at least some of the products, it may then be separated and purified merely by distillation, usually at reduced pressure.

In the event that the product is susceptible to degradation on heating, distillation, or during other processing such as in chromatographic procedure, the crude extract product is esterified by refluxing, e.g., with acetic anhydride. The reaction mixture is then treated with excess sodium bicarbonate in saturated aqueous solution until $CO_2$ evolution ceases, to destroy residual acetic anhydride and neutralize acidity. The product is then extracted with one of the aforesaid solvents, the extract is dried, filtered, evaporated and distilled as above to yield a hemiacetal-acetate-ester product. Hydrolysis, e.g., with a mild acidic solution, can free the purified hemiacetal which can then be recovered by the foregoing extraction procedure. The hemiacetals and esters can be fused, per se, as propellants or as intermediates in producing other compounds, e.g., by reduction or as plasticizers, etc. Results in synthesizing certain hemiacetals in dry solvent systems as compared to aqueous solvent systems are presented below in Table III for convenient comparison. Typical nitrodifluoro-hemiacetals and ester derivatives thereof are set forth in Table I, and nuclear magnetic resonance data for certain of such compounds are set forth in Table II below.

The foregoing reaction proceeds at about the same rate under either acidic or basic conditions, with typically used procedure wherein basicity of the medium is not controlled. Reduction under acidic conditions, i.e., in the range of pH 5–8, does, however, tend to increase the amount of hemiacetals in the product. Mole ratios of about 1 to 1 of $NaBH_4$ to ester, i.e., about 4 equivalents of $NaBH_4$ to ester, is about optimum, and no advantage was found in using $NaBH_4$ in excess of this amount. Incomplete reduction was obtained using a stoichiometric equivalent of one mole hydride to four moles of ester. Unduly prolonged reaction periods cause low yields, so that prompt work-up is advisable. Lowering the temperature to about 0–2° C. also increases the proportionate yield of aldehyde and hemiacetal. Various reaction conditions and the resulting products are set forth in Table III below.

TABLE I.—NITRODIFLUOROETHYL HEMIACETALS

| Compound | Structure | B.P. |
|---|---|---|
| 1,1,1-nitrodifluoroethyl hemiacetal | | |
| Isopropyl | $NO_2CF_2\overset{\overset{\displaystyle OH}{\vert}}{\underset{\underset{\displaystyle H}{\vert}}{C}}OC(CH_3)_2$ | 60–62°/32 mm. |
| Isopropyl-acetate ester | $NO_2CF_2\overset{\overset{\displaystyle OCOCH_3}{\vert}}{\underset{\underset{\displaystyle H}{\vert}}{C}}\!-\!O(CH_3)_2$ | 82–83°/28 mm. |
| Methyl | $NO_2CF_2\overset{\overset{\displaystyle OH}{\vert}}{\underset{\underset{\displaystyle H}{\vert}}{C}}OCH_3$ | 68–60°/35 mm. |
| Methyl-acetate ester | $NO_2CF_2\overset{\overset{\displaystyle OCOCH_3}{\vert}}{\underset{\underset{\displaystyle H}{\vert}}{C}}OCH_3$ | 86–87°/28 mm. |
| t-Butyl | $NO_2CF_2\overset{\overset{\displaystyle OH}{\vert}}{\underset{\underset{\displaystyle H}{\vert}}{C}}OC(CH_3)_3$ | Unstable product. |
| t-Butyl-acetate ester | $NO_2CF_2\overset{\overset{\displaystyle OCOCH_3}{\vert}}{\underset{\underset{\displaystyle H}{\vert}}{C}}OC(CH_3)_3$ | Do. |
| Ethylene glocyl-(BEAF derivative) | $(NO_2CF_2\overset{\overset{\displaystyle OH}{\vert}}{\underset{\underset{\displaystyle H}{\vert}}{C}}O)_2CH_2CH_2\!-$ | Isolated as acetate. |
| Ethylene glycol-acetate ester | $(NO_2CF_2\overset{\overset{\displaystyle OCOCH_3}{\vert}}{\underset{\underset{\displaystyle H}{\vert}}{C}}O)_2CH_2CH_2\!-$ | 80–82°/32 mm. |
| 2,2-dinitropropyl | $NO_2CF_2\overset{\overset{\displaystyle OH}{\vert}}{\underset{\underset{\displaystyle H}{\vert}}{C}}OCH_2C(NO_2)_2CH_2$ | 65°/0.05 mm. (decomposes). |
| 2,2-dinitropropyl-acetate ester | $NO_2CF_2\overset{\overset{\displaystyle OCOCH_3}{\vert}}{\underset{\underset{\displaystyle H}{\vert}}{C}}OCH_2C(NO_2)_2CH_3$ | 97–100°/0.04 mm. |

TABLE II.—NMR DATA FOR NITRODIFLUOROHEMIACETALS[1]

$$O_2N\!-\!\overset{\overset{\displaystyle F}{\vert}}{\underset{\underset{\displaystyle F}{\vert}}{C}}\!-\!\overset{\overset{\displaystyle OR'}{\vert}}{\underset{\underset{\displaystyle OR}{\vert}}{C}}H$$

| Reference | R'=H<br>R=CH_3 | R'=OCCH_3<br>R=OCH(CH_3)_2 | R=R''=OCCH_3 |
|---|---|---|---|
| $\delta CH_3(R)$ | +59 (S) | +157 (D) | +118 (S) |
| $\delta CH_3(R')$ | | +119 (S) | +118 (S) |
| $\delta$ CH | −8 (T) | −97 (T) | −56 (Q_a) |
| $\delta$ CH(R) | | +40 (Septet) | |
| $\delta$ OH | +3 (S) | | |
| $\delta$ CF_2 | $\left\{\begin{array}{l}+920\\+1,074\end{array}\right\}$ AB each (D) | $\left\{\begin{array}{l}+799\\+949\end{array}\right\}$ AB each (D) | +897 (D) |
| J:CH_3(R)CH(R) | | 6.4 | |
| J:CH, CF_2 | 6.2; 6.3 | 5.7; 7.7 | 6.1 |
| J:CF_2; CF_2 | 174 | 171 | |

[1] Typical nitrodifluorohemiacetals are found in Table I.

NOTE.—Units are cps. at 40 mc.; S=singlet, D=doublet, T=triplet, Q_a=quartet; proton shifts are with respect to external $H_2O$; $F^{19}$ shifts are with respect to external hexafluoroacetone.

TABLE III.—DIFLUORONITROACETATE REDUCTIONS BY SODIUM BOROHYDRIDE

| Exp. No. | Acetate ester | Solvent | $NaBH_4$-ester, mole ratio | Reaction time and temp. | pH | Product acetates, relative abundance [a] | Remarks |
|---|---|---|---|---|---|---|---|
| 80 | Methyl | 50% $H_2O$-DME | 0.64/0.60 | 22 min. at −10 to 0° C. | Basic | Alcohol, 49%<br>Aldehyde, 38%<br>Hemiacetal, 38% | |
| 82 | do | DME | 0.64/0.60 | 20 min. at 25° C | do | Alcohol, 25%<br>Aldehyde, 6%<br>Hemiacetal, 48% | This experiment was run similarly for all "dry" systems. |
| 83 | do | MeOH-$H_2O$ [c] | 0.64/0.60 | 15 min. at −10 to 0° C | do | All products | Very low yield, 25%. |
| 89 | do | 50% $H_2O$-DME | 0.64/0.60 | 40 min. at −10 to 0° C | pH <4 | Alcohol<br>Aldehyde, 39%<br>Hemiacetal, 33% | |
| 95 | do | 50% $H_2O$-DME | 0.64/0.60 | 25 min. at 0 to 10° C | pH 7-8 [d] | Alcohol, 10%<br>Aldehyde, 42%<br>Hemiacetal, 38% | |
| 97 | do | 50% $H_2O$-DME | 0.64/0.60 | 25 min. at 0 to 10° C | Basic | Alcohol, 10%<br>Aldehyde, 33%<br>Hemiacetal, 30% | |
| 65 | Ethyl | DME | 0.60/0.059 | 45 min. at 25 to 30° C | do | Alcohol, 10%<br>Aldehyde, 7%<br>Hemiacetal, 75% | |
| 73 | do | 50% $H_2O$-DME | 0.03/0.029 | 42 min. at 25 to 30° C | do | Alcohol, 82% | Low yield. |
| 110 | Isopropyl | 50% $H_2O$-DME | 0.054/0.054 | 15 min. at 20 to 24° C | do | Alcohol, 8%<br>Aldehyde, 13%<br>Hemiacetal, 37% | |
| 50 | Bis ethylene glycol | DME | 0.0.16/0.032 | 40 min. at 30° C | do | Alcohol, 60%<br>Aldehyde, 20%<br>Hemiacetal, 13% | |
| 47 | Bis 2,2-dinitropropanediol | DME | 0.06/0.12 | 90 min. at 25 to 30° C | do | Alcohol, 31%<br>Aldehyde, 56%<br>Other, 12% | |

[a] Products were isolated as a mixture of acetates for analytical purposes. Gross yields of the acetates ranged from 20–35%. The percentages given reflect the relative abundance of the three reduction products.
[b] Alcohol=2,2,2-Difluoronitroethanol (acetate). Aldehyde=Difluoronitroacetaldehyde (acetate). Hemiacetal=Alkyl difluoronitroacetaldehyde hemiacetal (acetate). (General structure: $NO_2CF_2CH(OH)OR$).
[c] In water less than 5% of product is formed.
[d] At pH 5–7 similar results were obtained.
[e] This hemiacetal acetate had the structure: $NO_2CF_2CH(OCOCH_3)OCH_2CH_2OCOCH_3$.

FLUORONITRO-ALDEHYDE COMPOUNDS

The proportion of aldehyde produced in the reactions described above, as well as hereinafter, tends to be increased by using methyl difluoronitroacetate ester, lesser than equimolar equivalent amounts of $NaBH_4$, down to a stoichiometric ratio of 1 to 1 based on the hydrogen in the $NaBH_4$, lower temperatures and slightly more acidic conditions, i.e., in the range pH 5 to 8, variously with either dry solvent or aqueous solvent mixtures, as may be seen from Table III above and in Table IV below. Generally, the aldehydes are recovered as the diacetate esters, since such aldehydes are more temperature-sensitive than are the hemiacetals or alcohols. The ester derivatives are separated by extraction and distillation, as described above. The diacetate esters can be used as plasticizers or as intermediates in producing other compounds. Also, such aldehyde esters could be further reduced with $NaBH_4$ to provide an alcohol derivative in the procedure described below, or the aldehyde could be recovered by mild hydrolysis as above.

FLUORONITRO-ALDEHYDE COMPOUNDS AND DERIVATIVES THEREOF

The proportion of aldehyde produced in the reactions obtain a fluorinitro-alcohol as the predominant product, an aqueous solvent system, i.e., a mixture of a particular solvent of the character described, with water is employed. Dimethoxyethane (DME) and tetrahydrofuran (THF) have been found especially suitable. Mixtures of either DME or THF with about 25 to 75% water by volume are generally suitable, with 50% by volume mixtures being conveniently optimum. Solutions of the starting ester and of $NaBH_4$ in such solvents are intermixed, whereupon the reduction reaction proceeds to completion exothermically, generally in less than one hour.

The benzyl ester of difluoronitroacetic acid yields exclusively an alcohol product in high yield, while ethyl difluoronitroacetate, as shown in Table III, and isopropyl difluoronitroacetate can also yield the alcohol exclusively, but in low yield. The alcohol does, moreover, appear in low-to-significant proportions of the yield, with several of the other starting esters described herein, e.g., in Table III, and in both aqueous and nonaqueous systems. An optimum procedure employed in producing 2,2,2-difluoronitroethanol, described hereinafter, is generally typical of the preferred procedure employed in producing α-fluoronitro-alcohols in accordance with the invention.

As to the production of 2,2,2-difluoronitroethanol, a compound of particular value as a monopropellant, per se, or to synthesize other propellants and explosive compositions, an optimum procedure comprises adding an aqueous THF sodium borohydride solution to an equimolar amount of benzyl difluoronitroacetate similarly dissolved in a mixture of water and THF, as set forth in g. of Table IV hereinafter. Other conditions applicable to the production of 2,2,2-difluoronitroethanol are also set forth in Table IV below.

TABLE IV.—DIFLUORONITROACETATE REDUCTIONS BY SODIUM BOROHYDRIDE

| Acetate ester | Solvent | NaBH₄/ester mole ratio | Reaction time[a] min. (temp. °C.) | Relative abundance of prod. acetates,[b] percent | | |
|---|---|---|---|---|---|---|
| | | | | Alc. | Ald. | Hem. |
| Methyl | 50% H₂O-DME[c] | 0.64/0.60 | 22(−10-0)(pH 4 to autogenous) | 5 | 45 | [d]45 |
| Do | DME | 0.64/0.60 | 20(25) | 32 | 8 | 60 |
| Do | 50% H₂O-DME | 0.64/0.60 | 25(0-10)(pH 7.8) | 11 | 46 | 43 |
| Do | 50% H₂O-DME | 0.64/0.60 | 25(0-10) | 14 | 45 | 41 |
| Ethyl | DME | 0.60/0.059 | 45(25-30) | 10 | 8 | 82 |
| Isopropyl | DME | 0.11/0.12 | 40(20-24) | | | [e](45) |
| Do | 50% H₂O-DME | 0.054/0.054 | 15(20-24) | 15 | 22 | 63 |
| Benzyl | 50% H₂O-DME | 0.086/0.086 | 15(18-22) | [f](32) | | |
| Do | 50% H₂O-DME | 0.043/0.043 | 10(0-2) | 22 | 7 | 7 |
| Do | 50% H₂O-DME | 0.1/0.055 | 5(18-20) | 23 | 32 | 11 |
| Do | 50% H₂O-DME | 0.51/0.51 | 30(10-12)(pH 5-7) | [g](70) | | |
| Do | 50% H₂O-DME[c] | 0.169/0.169 | 30(15-18) | [b]2 | 8 | 22 |
| Do | 50% H₂O-THF[c] | 0.25/0.25 | 20(10-12) | 100 | | |

[a] Autogenous basicity except where indicated.
[b] Products were isolated as a mixture of acetates for analytical purposes. Gross yields of the acetates ranged from 20 to 45%; the percentages given in the column reflect the relative abundance of the three reduction products by GLPC analysis.
[c] DME=dimethoxyethane.
[d] Alcohol=2,2,2-difluoronitroethanol (acetate); aldehyde=difluoronitroacetaldehyde (diacetate); hemiacetal= alkyl difluoronitroacetaldehyde hemiacetal (acetate); general structure, NO₂CF₂CH(OR)—(OOCCH₃).
[e] Isolated yield of hemiacetal based on starting material.
[f] Isolated yield of alcohol.
[g] Isolated yield of alcohol; this method was used for subsequent alcohol preparations; in tetrahydrofuran, 52% yield.

At the conclusion of the reaction, the α-difluoronitroalcohol can generally be recovered by extraction with a low-boiling solvent such as ether or methylene chloride, the extract dried as with MgSO₄, filtering MgSO₄ from the extract, evaporating the solvent and separating and purifying the extract by means of vacuum distillation. In the event that the particular alcohol is sensitive to heat, the products may be esterified by reaction with acetic anhydride and the esters purified by distillation. The alcohol can then be regenerated by hydrolyzing in a mildly acidic aqueous medium, followed by extraction, drying, filtering and similar operations as above.

There have been few examples reported heretofore of ester reduction by sodium borohydride, which normally has no effect on the ester group, and none of such which have produced the hemiacetal as an identifiable product. The present instances appear to be a unique example of such a reduction. In the reduction of difluoronitroacetate to a hemiacetal, the reaction apparently involves transfer of a hydride ion to the carbonyl group in a bimolecular nucleophilic displacement to produce an alkaoxide ion which coordinates with the borohydride. Reaction with water yield methyl difluoronitroacetaldehyde.

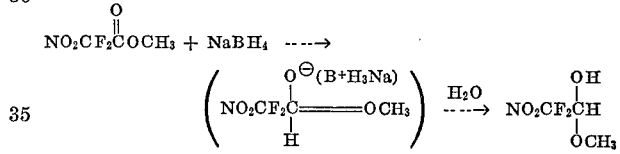

A similar course for the first step is followed in conventional lithium aluminum hydride (LAH) reductions of esters, but this step is then followed by cleavage of the alcohol oxygen bond and reaction of a second mole of ester with the LAH complex. The nuclear magnetic resonance data of various fluoronitro-products are given in Table V below.

TABLE V—NUCLEAR MAGNETIC RESONANCE DATA ON FLUORONITRO PRODUCTS*

| Compound | Spectrum | Peak | Assignment | Peak position | J value |
|---|---|---|---|---|---|
| O₂NCF₂CH₂OH | H′ | Triplet | —CH₂— | 5.8τ | 8.8 |
| | H′ | Singlet | —OH | 6.0τ | |
| | F¹⁹ | Triplet | —CF₂— | 91.0 p.p.m. | 8.89 |
| O₂NCF₂CH(OCOCH₃)OCH₂(C₆H₅) | H′ | Singlet | Phenyl | 2.7τ | |
| | H′ | Multiplet | Asym.—CH | 3.6τ | 7.0 |
| | H′ | Singlet | —CH₂— | 5.2τ | |
| | H′ | do | —CH₃ | 8.0τ | |
| O₂NCF₂CH(OCOCH₃)OCH₂CH₂OCOCH₃ | H′ | Multiplet | Asym.—CH | 3.63τ | 8.0 |
| | H′ | do | —CH₂— | 6.0τ | |
| | H′ | Singlet | —CH₃ | 7.8τ | |
| | H′ | do | Acetate—CH₃ on asym.—CH CF₂. | 8.0τ | |
| | F¹⁹ | Triplet | CF₂ | 99.1 p.p.m. | 8.3 |
| O₂NCF₂CH₂(OCH₂)₄CF₂NO₂ | H′ | Singlet | —OCH₂— | 5.1τ | |
| | H′ | Triplet | —CF₂CH₂— | 5.7τ | 8.5 |
| | F | do | CF₂ | 93.8 p.p.m. | 8.0 |
| (O₂NCF₂CH₂O)₂CH₂ | H′ | Singlet | —OCH₂— | 5.26τ | |
| | H′ | Triplet | —CF₂CH₂— | 5.70τ | 8.25 |
| | F¹⁹ | do | —CF₂— | 93.5 p.p.m. | |
| O₂NCF₂CH₂OCH₂OCOCH₃ | H′ | Singlet | —OCH₂— | 4.75τ | |
| | H′ | Triplet | —CF₂CH₂— | 5.50τ | 8.4 |
| | H′ | Singlet | —CH₃ | 8.40τ | |

*In all spectra, tetramethylsilane was the internal reference for proton and CFCl₃ for fluorine; spectrometer was the Varian HR 60.

Formation of a hemiacetal from an ester in dry dimethoxyethane (DME) using sodium borohydride indicates that the alcohol oxygen bond does not cleave to a large extent, and that the reaction proceeds in a minor way as far as the intermediate formation of an aldehyde. Apparently, the sodium borohydride salt of each intermediate is too stable for the bond between the alcohol oxygen and the carbonyl to cleave in dry solvent systems. Precipitation of the borate salt by the solvent undoubtedly contributes to this situation.

Aqueous solvent systems, used as described above, have been found to promote the alcohol oxygen carbonyl bond cleavage, but not for all ester starting materials. In aqueous systems which do not have alcohol as part of the solvent pair, the reduction rate is fast enough, especially in the benzyl ester case, to outstrip competitive hydrolysis reactions of the borohydride and organic intermediates. Alcohol-water solvents provide substantially none of the present products, in contrast to conventional experience using an excess of acrylic acid. Further improvement in product purity was obtained from careful purification of the starting materials before esterification. Acrylic acid was purified by repeated fractional crystallization in a tube or flask; the impure unfrozen portions were poured off and discarded. This technique provided acrylic acid of better than 99% purity. Acrylic acid of this purity is now available commercially.

Esterification conditions and results are summarized in Table VI. The esterification of acrylic acid was successful only if the starting alcohol and acid were better than 98% pure. Only a minimum amount of sulfuric acid catalyst was used to avoid decomposition and polymerization. The product difluoronitroethyl acrylate was a stable, water-white liquid which had no tendency to polymerize on storage at room temperature, but polymerized easily under conventional reaction conditions to provide explosive solids or binder for explosives, as with the other derivatives listed in Table VI.

NOTE.—ESTERS OF DIFLUORONITROETHANOL

| Ester | Registry number | Method | Yield, percent | B.p.(mm.) or M.P.°C. | Calculated, percent C | H | N | Found percent C | H | N |
| --- | --- | --- | --- | --- | --- | --- | --- | --- | --- | --- |
| Acetate | 13168-68-8 | (Ac)₂O, 25° | 70 | 54(20) | 28.40 | 2.91 | 8.30 | 28.57 | 3.06 | 8.21 |
| Malonate | 13168-69-9 | Azeotrope in benzene | 54 | 110(54) | 26.10 | 1.86 | 8.76 | 26.30 | 1.62 | 8.70 |
| Acrylate | 13168-69-9 | ...do... | 70 | 58(15) | 33.05 | 2.76 | 7.75 | 33.04 | 2.98 | 7.08 |
| Maleate | 13168-70-2 | ...do... | 56 | 102(0.05) | 38.75 | 1.79 | 8.35 | 28.35 | 1.83 | 8.31 |
| Fumarate | 13168-71-3 | Catalysis of acid chloride | 22 | 45-48 | 28.75 | 1.79 | 8.35 | 28.85 | 1.96 | 8.93 |
| Ithaconate | 13168-72-4 | Azeotrope in benzene | 47 | 110(0.05) | 31.10 | 2.30 | 8.05 | 31.21 | 2.49 | 8.50 | with the reduction of nitroaldehydes and ketones by borohydride in aqueous methanol. The reason why methyl difluoronitroacetate gives all three reduction products under a variety of conditions is not clear. Evidence does indicate that the class of esters considered herein reduces in stepwise fashion. Hemiacetal formation is apparently confined principally to normal alkyl esters in dry nonhydroxylic solvents, as well as the bis diol esters of difluoronitroacetic acid which are most easily reduced. In aqueous solvents, the normal alkyl esters of two or more carbons and aryl esters reduce to the alcohol. Sodium borohydride, therefore, appears to be a rather unique agent for effecting the desired reductions. LAH, a stronger reducing agent, employed in efforts to obtain more complete reduction, generally produced explosive reactions. In one instance where the reaction rate was successfully controlled, a low yield of hemiacetal was obtained. Lithium borohydride produced no isolatable products.

DIFLUORONITROETHANOL-DERIVATIVES

Several methods for the synthesis of esters of negatively substituted alcohols were tried with difluoronitroethanol and unsaturated acids or their chlorides. Positive results were obtained with fumaryl chloride using titanium tetrachloride catalysis. Poor results were obtained from direct esterification in polyphosphoric acid and with α-toluenesulfonic acid catalyst in benzene. The best over-all results were obtained by the conventional sulfuric acid catalyzed direct esterification with water removed azeotropically from benzene. The yields averaged about 50–60% normally, with 70% yield having been obtained on occasion. Evidence was obtained that the yield of the reaction may be diminished to some extent by the sulfuric acid dehydrating catalyst, inasmuch as some of the higher yields were obtained with the least amount of acid catalyst. Unreacted alcohol and a high-boiling impurity were usually found in the products from the early experiments using lesser amount of acrylic acid and the impure acrylic acid then available. The alcohol co-distilled and could be removed only by column chromatography. The high-boiling material, constituting only a few percent of the product, also co-distilled and remained throughout the purification attempts.

Unreacted alcohol in the product was prevented by

Further details of the process of the invention will be apparent from the following specific and illustrative examples:

EXAMPLE I 2,2,2-difluoronitroethanol

A solution of 9.80 g. (0.259 mole) of sodium borohydride in 60 ml. of water was added over 20 min. to a stirred solution of 60 g. (0.252 mole) of benzyl difluoronitroacetate, B.P. 65° (0.7 mm.), in 150 ml. of tetrahydrofuran and 90 ml. of water at 10–12°. The reaction mixture was stirred vigorously an additional 10 minutes until the exotherm had subsided. The solution was extracted twice by shaking vigorously with 300 ml. of ether, the extract dried over $MgSO_4$, and the ether removed in vacuo. Fractional distillation produced 22.7 g. (70%) of 2,2,2-difluoronitroethanol, B.P. 59–61° (22 mm.), 94% pure. Redistillation gave a 90% recovery of alcohol greater than 97% purity, $n_D^{20}$ 1.3747.

Analysis.—Calcd. for $C_2H_3F_2NO_3$ (percent): C, 18.90; H, 2.37; N, 11.00. Found (percent): C, 18.83; H, 2.49; N, 10.93.

Proton NMR ($CDCl_3$ solvent) gave a singlet at γ 6.0 (OH), triplet at γ 5.8 ($CH_2$, J=8.04 cps.); fluorine NMR gave a triplet at 91.0 p.p.m. (J=8.04 cps.)

EXAMPLE II

Isopropyl hemiacetal of nitrodifluoroacetaldehyde

To a stirring suspension of 4.0 grams (1.107 M) of sodium borohydride in 80 ml. of dry 1,2-dimethoxy ethane at 20–25° C. was added 21.96 grams (0.12 M) of the isopropyl ester of nitrodifluoroacetic acid over a 10-minute period. The mixture was stirred for an additional 30 minutes. The reaction mixture was then poured into 100 ml. of ice water and extracted twice with 75 ml. of diethyl ether. The ether solution was dried over $MgSO_4$, filtered, and the ether evaporated at 35° C./30 mm. The remaining crude product was then distilled, yielding 9.95 grams (45%, B.P. 60–62°/32 mm.) of isopropyl nitrofluoroacetal.

EXAMPLE III

Methyl hemiacetal of nitrodifluoroacetaldehyde

At pH 3–4.—To a stirring solution of 70.0 grams (0.45 M) of methyl difluoronitro acetate in 100 ml. of methanol at −60° to −40° C. was added portionwise 10 grams (0.27 M) of sodium borohydride dissolved in 100 ml. of water. The pH of the solution was kept between 3-4 by addition of 6 normal $H_2SO_4$. The reaction mixture was poured into 250 ml. of water and extracted with 150 ml. of ethyl ether. The ether solution was dried over $MgSO_4$, filtered, and the ether evaporated at 35° C./30 mm. The remaining liquid was then distilled, yielding at 58-60° C./35 mm., 8.0 grams (8%) of methyl nitrodifluorohemiacetal. Calcd. for $C_3H_4F_2NO_4$ (percent): C, 23.00; H, 2.58; N, 9.03. Found (percent): C, 22.65; H, 2.17; N, 8.35.

At uncontrolled pH.—To a stirring suspension of 4.0 grams (0.107 M) of sodium borohydride at 20-25° C. in 80 ml. of 1,2-dimethoxy ethane was added 18.6 grams (0.12 M) of the methyl ester of nitrodifluoroacetic acid over a period of 10 minutes. The mixture was stirred for 30 minutes and then poured into 100 ml. of ice water. The aqueous solution was extracted twice with 75 ml. of ether, dried over $MgSO_4$, filtered and evaporated at 35° C./35 mm. Distillation of the remaining crude product at 57-59°/29 mm. gave 3.8 grams (23%) of methyl nitrodifluorohemiacetal. The aqueous solution was then neutralized to pH 4 with concentrated $H_2SO_4$ and re-extracted. No additional product was obtained.

EXAMPLE IV

Reduction of methyl difluoronitroacetate

Over a period of 25 minutes at 0-10°, 2.27 g. of $NaBH_4$ was added to a stirred solution of 10 g. (0.064 mole) of methyl difluoronitroacetate in 20 ml. of 1,2-dimethoxyethane and 10 ml. of water. The mixture was carefully acidified to pH 2 with 12 N HCl, and extracted vigorously twice with 100 ml. of ether. The ether solution was dried over magnesium sulfate, and evaporated at 18-20 mm. using no heat. The residue which remained (10 g.) was added to 20 ml. of acetic anhydride and stirred at room temperature for 16 hours. The reaction solution was poured into 50 ml. of water and stirred to hydrolyze excess acetic anhydride, and then extracted with 100 ml. of methylene chloride. The methylene chloride solution was washed twice with 50 ml. portions of saturated sodium bicarbonate solution, dried over magnesium sulfate, and evaporated at 18 mm. using no heat. The material remaining weighed 4.1 g., and was identified as a mixture of the following products:

(1) 10%—Difluoronitroethanol acetate: B.P. 50-54°/ 15 mm. Calcd. for $C_4H_5F_2NO_4$ (percent): C, 28.4; H, 2.94; N, 8.28. Found (percent): C, 29.1; H, 3.28; N, 7.80.

(2) 43%—Acetate ester of methyl difluoronitroacetaldehyde hemiacetal: B.P. 68-70°/15 mm. (Identified by gas liquid phase chromatography (GLPC) by identity with known authentic compound on SE-30 4-ft. column.)

(3) 37%—Difluoronitroacetaldehyde diacetate: B.P. 81°/15 mm. Calcd. for $C_6H_6F_2NO_6$ (percent): C, 31.7; H, 3.10; N, 6.16. Found (percent): C, 32.4; H, 3.50; N, 6.20.

(4) Unidentified: 3 component, each <4%; one probably $H_3CCOOH$.

The acetates of the alcoholic products resolved in GLPC (gas liquid phase chromatography) better than the parent alcohols. A silicone substrate on a diatomaceous earth column gave better resolution than any of the other columns available. Programming from 50-150° at 7.9°/min. with block temperature at 155°, injection port at 155°, and a flow rate of 55 ml. per minute were found to be best conditions for chromatographing the acetates. Difluoronitroethanol gave good resolution when isolated as a pure or nearly pure product. However, a mixture of difluoronitroethanol, difluoronitroacetaldehyde, and the hemiacetals was poorly resolved by all available columns and conditions tried. Benzyl alcohol and difluoronitroethanol were both well resolved. A di-n-decyl phthalate column was used on occasion, and was particularly good in resolving alcohol and ester mixtures.

EXAMPLE V

Acetate ester of isopropyl nitrodifluorohemiacetal

A solution of 12.0 grams (0.065 M) of crude isopropyl nitrodifluorohemiacetal in 15 ml. of acetic anhydride was refluxed for two hours. The solution turned slightly dark. The reaction solution was poured into 100 ml. of saturated sodium bicarbonate solution with vigorous stirring. After evolution of carbon dioxide had stopped, the product was extracted with 50 ml. of ether, dried over $MgSO_4$, filtered, and evaporated under reduced pressure. The residual crude ester was distilled, giving 2.7 grams (18%) of product, B.P. 82-83° C./28 mm. Calcd. for $C_7H_{11}F_2NO_5$ (percent): C, 36.60; F, 16.70; N, 6.17. Found (percent): C, 36.90; F, 16.75; N, 6.16.

EXAMPLE VI

Acetate ester of methyl nitrodifluorohemiacetal

A mixture of 40 g. (0.027 M) of methyl nitrodifluorohemiacetal and 5 ml. of acetic anhydride was refluxed for four hours. The reaction solution was poured into 75 ml. of saturated sodium bicarbonate solution, extracted with 20 ml. of ether, and dried over $MgSO_4$. After evaporation of the ether at room temperature, the small amount of material remaining was distilled at 86-87° C./0.28 mm.; yield, 0.2 gram (2.7%).

EXAMPLE VII

Nitrodifluoroacetaldehyde diacetate

To a stirring suspension of 3.7 grams (0.028 M) of aluminum chloride and 15.0 grams (0.081 M) of isopropyl nitrodifluoroacetate in 50 ml. of 1,2-dimethoxy ethane at 25-30° was added 3.20 grams (0.081 M) of sodium borohydride at such a rate that the temperature did not rise above 35°. After the exothermic reaction had subsided, the mixture was stirred an additional hour. The reaction mixture was poured into 50 ml. of cold water containing 10 ml. of concentrated HCl, extracted with 75 ml. of ether, dried over $MgSO_4$, and filtered. Evaporation of the solvent left a small amount of liquid which was then refluxed in 5 ml. of acetic anhydride for five hours. The reaction solution was poured into 50 ml. of ice water, and enough sodium bicarbonate was added to bring the pH of the solution to 8. After one hour, the aqueous solution was extracted with 50 ml. of ether, dried over $MgSO_4$, filtered, and evaporated to a residual liquid. The crude product was distilled at 92°/28 mm., giving 1.59 grams (8%, based on 0.081 M of starting ester) of nitrodifluoroacetaldehyde diacetate.

Elemental analysis: Calcd. for $C_6H_7F_2NO_6$ (percent): C, 32.00; H, 3.10. Found (percent): C, 31.34; H, 3.40.

The NMR data on the preceding compound are summarized in Table II.

Following are facile procedures for the preparation of benzyl difluoronitroacetate.

EXAMPLE VIII

Benzyl difluoronitroacetate

To 520 g. (4.80 mole) of benzyl alcohol at 10-15° was added, with vigorous stirring over 30 minutes, 1000 g. of the reaction products of nitrogen dioxide and chlorotrifluoro ethylene, containing 400 g. of 1-chloro-2-nitro-1,2,3-trifluoroethyl nitrite. The solution was stirred for 3 hours to allow the exothermic reaction to subside and come to room temperature. The solution was dissolved in 500 ml. of methylene chloride and washed twice with 400 ml. of saturated sodium bicarbonate solution. The solution was dried over magnesium sulfate and distilled. After removal of the low-boiling by-products through distillation, 352 g. (79.5%) of benzyl difluoronitro acetate (95.5% purity) was obtained, boiling at 65-70° at 0.7 mm.

Infrared spectrum, max. ( ) CH=3.40; CO=5.60; O₂N=6.25; Cf=7.60; aromatic benzyl=13.30, 14.30.

EXAMPLE IX

Unsaturated esters of 2,2,2-difluoronitroethanol 2,2,2-Difluoronitroethyl acrylate A solution of 57.6 grams (0.8 M) of freshly distilled acrylic acid, 50.8 grams (0.4 M) of difluoronitroethanol, 3 ml. of 96% sulfuric acid, and 15 mg. of hydroquinone in 100 ml. of benzene was allowed to reflux under a Dean-Stark trap until the theoretical amount of water was collected (30 hours). The solution was washed twice with 150 ml. of water, followed by washing with 150 ml. of saturated bicarbonate solution. The solution was dried over magnesium sulfate and filtered, and the benzene was removed at 20 mm. at 25–30° C. Distillation of the residue gave 50 grams (69.5%) of 2,2,2-difluoronitroethyl acrylate, B.P. 58° at 15 mm.

EXAMPLE X

Bis(2,2,2-difluoronitroethyl)-itaconate

A mixture of 3.2 grams (0.0246 M) of itaconic acid, 7.0 grams (0.055 M) of difluoronitroethanol, 0.3 ml. of 96% sulfuric acid, and 10 ml. of toluene was allowed to reflux under a Dean-Stark trap for 5 hours. During this time, the theoretical amount of water was collected (1.1 ml.). The solution was poured into 50 ml. of methylene chloride, washed with 50 ml. of saturated sodium bicarbonate solution, and dried over magnesium sulfate. After removal of solvent at 40°/18 mm., 4.0 grams (46.8%) of bis(2,2,2-difluoronitroethyl)-itaconate was obtained, B.P. 110–12° at 0.05 mm. Hg.

EXAMPLE XI

Bis(2,2,2-difluoronitroethyl)-maleate

A solution of 19 grams (0.149 M) of difluoronitroethanol, 6.5 grams (0.066 M) of maleic anhydride, 0.2 ml. of 96% sulfuric acid, and 20 ml. of benzene was allowed to reflux under a Dean-Stark trap until the theoretical amount of water was collected (18 hours). The solution was diluted to 40 ml. with benzene, washed with 50 ml. of saturated sodium bicarbonate, dried over magnesium sulfate, and filtered, and the benzene was removed at 50–60° at aspirator pressure (18 mm.). The residue was distilled to give 12 grams (55.5%) of bis-(difluoronitroethyl)-maleate. B.P. 102–104° at 0.05 mm. Hg. Calcd. for $C_8H_6F_4N_2O_8$ (percent): C, 28.8; H, 1.79; N, 8.35. Found (percent): C, 30.36; H, 1.83; N, 8.19.

EXAMPLE XII

Bis(2,2,2-difluoronitroethyl)-fumarate

To a stirring solution of 20 grams (0.158 M) of difluoronitro ethanol, and 10 grams (0.065 M) of fumaryl chloride in 10 ml. of chloroform, 4 ml. of titanium tetrachloride were added at 25° C. over a 10-minute period.

Vigorous gas evolution was observed, and the reaction was allowed to stir for an additional 2 hours. The solution was poured into 100 ml. of methylene chloride, washed with 50 ml. of saturated sodium bicarbonate, dried over magnesium sulfate, filtered, and evaporated to a semi-solid residue. The residue was dissolved in 20 ml. of hot benzene, treated with norit and filtered. On chilling, 7.0 (21.8%) of bis(difluoronitroethyl)-fumarate were obtained, melting at 45–46° C. Calcd. for $C_8H_6F_4O_8$ (percent): C, 28.8; H, 1.80; N, 8.35. Found (percent): C, 28.85; H, 1.96; N, 8.03.

EXAMPLE XIII

Bis(2,2,2-difluoronitroethyl)-malonate

A mixture of 15 grams (0.144 M) of malonic acid, 40 grams (0.317 M) of difluoronitroethanol, and 0.5 ml. of 96% $H_2SO_4$ was allowed to reflux with stirring under a Dean-Stark trap until the theoretical amount of water was collected (8 hours). The solution was washed with 100 ml. of saturated sodium bicarbonate solution, dried over magnesium sulfate and filtered, and the benzene was evaporated off at 60°/20 mm., leaving a colorless liquid. A fractional distillation of this material gave 25 grams (54%) of bis(w,w,w-difluoronitroethyl)-malonate, boiling at 110–115° at 0.05 mm.

Starting materials may be prepared as follows:

Methyl and isopropyl nitrodifluoroacetates used in the foregoing examples were obtained by the alcoholysis of 1,1,2-trifluoro-1-nitro-2-chloroethyl nitrate which was prepared by the addition of $N_2O_4$ to chlorotrifluoroethylene (E. R. Bissell, J. Org. Chem. 26, 1961, and aforesaid patent).

α-Nitrofluorocarboxylic acids can be prepared by the method of Knunyants and Fokin, Daklardy, Akad Nauk, USSR, 112 67 (1957), as typified by the production of difluoronitroacetic acid. Details of the esterification reactions are disclosed in the above-identified publication of Knunyants, et al., and in the aforesaid patent of Eugene R. Bissell.

The aforesaid patent to Gardner, et al., discloses that $NO_2CF_2COOH$ can be prepared by the reaction of $N_2O_4$ with tetrafluoroethylene, followed by hydrolysis, as shown, according to the following equations:

$$CF_2=CF_2+N_2O_4 \rightarrow NO_2CF_2CF_2ONO$$
$$NO_2CF_2CR_2ONO=H_2O \rightarrow$$
$$NO_2CF_2COOH+2HF+HONO$$

While there has been described in the foregoing what may be considered to be preferred embodiments of the invention, modifications may be made therein without departing from the concepts of the invention, and it is intended to cover all such as fall within the scope of the appended claims.

What is claimed is:

1. In a process of preparing 2,2,2-difluoronitroethanol, the steps comprising adding over a twenty minute period with stirring 0.259 mole of sodium borohydride contained in sixty ml. of water to 0.25 mole of benzyl difluoronitroacetate contained in a solution of 150 ml. of tetrahydrofuran and 90 ml. of water at a temperature between 10–12° C., and stirring the reaction mixture vigorously over an additional 10 minute period until the exotherm subsides extracting 2,2,2-dinitroethanol with ether from the resulting solution, and recovering the 2,2,2-dinitroethanol by distillation.

References Cited

UNITED STATES PATENTS

| | | | |
|---|---|---|---|
| 2,824,897 | 2/1958 | Wujciak et al. | 260—633 |
| 3,014,025 | 12/1961 | Pearson et al. | 260—638 R X |
| 2,856,428 | 10/1958 | Brown | 260—638 R X |
| 3,051,744 | 8/1962 | Bowers | 260—633 X |
| 3,510,458 | 5/1970 | Thayer | 260—633 X |
| 3,652,686 | 3/1972 | Nauflett et al. | 260—633 |
| 2,911,444 | 10/1959 | Baranauckas | 260—633 |
| 3,203,999 | 8/1965 | Gardner et al. | 260—633 |

HOWARD T. MARS, Primary Examiner

U.S. Cl. X.R.

260—469, 485 F, 486 H, 488 R, 491, 601 H, 615 A; 149—88